(12) United States Patent
Liu et al.

(10) Patent No.: US 6,445,379 B1
(45) Date of Patent: Sep. 3, 2002

(54) STRUCTURE OF CORDLESS MOUSE DEVICE

(76) Inventors: Hsien-Cheng Liu, P.O. Box No. 6-57, Chung-ho City, Taipei Hsien 235 (TW); Hsing-Hua Hsu, P.O. Box No. 6-57, Chung-ho City, Taipei Hsien 235 (TW); Shu-Chen Kuo, P.O. Box No. 6-57, Chung-ho City, Taipei Hsien 235 (TW); Chien-Sheng Lin, P.O. Box No. 6-57, Chung-ho City, Taipei Hsien 235 (TW); Chien-Hsing Liu, P.O. Box No. 6-57, Chung-ho City, Taipei Hsien 235 (TW)

( * ) Notice: Subject to any disclaimer, the term of this patent is extended or adjusted under 35 U.S.C. 154(b) by 0 days.

(21) Appl. No.: 09/541,510

(22) Filed: Apr. 3, 2000

(51) Int. Cl.7 ................................................. G09G 5/08
(52) U.S. Cl. ........................ 345/163; 345/157; 345/159; 345/160; 345/161; 345/167; 345/166; 345/184
(58) Field of Search ................................ 345/163, 166, 345/184, 157, 160, 161, 167, 159

(56) References Cited

U.S. PATENT DOCUMENTS 6,323,844 B1 * 11/2001 Yeh et al. .................... 345/166

* cited by examiner

Primary Examiner—Richard Hjerpe
Assistant Examiner—Ali Zamani
(74) Attorney, Agent, or Firm—Troxell Law Office PLLC

(57) ABSTRACT

An improved structure wireless mouse device comprised of a base board connected to a host computer and a mouse device, wherein no physical signal cable is present between the mouse device and the base board. The mouse device and the base board are equipped with internal circuitry that enables electric power from the host computer to be conveyed to the transmit/receive antenna of the base board and after reception by the mouse device, the electrical energy is supplied to its internal circuit. The two-dimension signal generated as the mouse device is moved on the base board is received by the transmit/receive antenna of the base board and transferred to the host computer to thereby enable control of the host system. The resulting wireless mouse device structure of the present invention differs significantly from conventional wireless mouse device arrangements in that the shortened interactive operating distance not only results in error-free signal detection and zero RF signal interference performance, but also does not require batteries, has a reduced malfunction rate, and is lightweight.

1 Claim, 4 Drawing Sheets

STRUCTURE OF CORDLESS MOUSE DEVICE

BACKGROUND OF THE INVENTION

1) Field of the Invention

The invention herein relates to an improved structure wireless mouse device that is extremely practical and capable of error-free signal detection and zero RF signal interference performance and, furthermore, does not require batteries, has a low malfunction rate, and is lightweight.

2) Description of the Prior Art

Based on the method of tracking positional displacement, mouse devices can be classified into three categories: roller ball, optical, and capacitive. However, since the optical and capacitive types of mouse devices require specialized pads having optical locating coordinates, these units do not have a strong market demand.

In terms of signal transmission approaches, there is hard-wired transmission, infrared transmission and radio frequency (RF) transmission.

Early mouse device structures relied on hard-wired signal transmission, wherein a signal cable was directly connected to a host computer to control the operation of the system. The internal structure consisted of a roller ball that was rotated on the surface of a desk. A two-dimension sensor registered the degree of movement on the flat surface and the corresponding data was conveyed into the host computer via the signal cable. Although such mechanical mouse device structures had high sensitivity characteristics, the signal cable tended to limit movement to a greater or lesser extent. Furthermore, since the signal cable was frequently pulled as the mouse device was maneuvered, broken wiring or poor wiring contact were common drawbacks.

Infrared signal transmission mouse devices are subject to operational limitations as well in that they must be aligned in the direction of a signal receiver. Even more inconvenient to operate are RF-type mouse devices. While their signal transmissions are non-directional, serious signal interference results when two or more such devices are operated within the same area. Furthermore, currently available wireless RF mouse device structures require internally installed batteries, making them overly heavy and costly. Signal reception degrades as their batteries become weaker, while there are also electrolyte corrosion risk and environmental protection-related battery recycling problems.

SUMMARY OF THE INVENTION

Therefore, the primary objective of the invention herein is to provide an improved structure cordless mouse device comprised of a base board connected to a host computer and a mouse device, wherein no physical signal cable is present between the mouse device and the base board; the mouse device and the base board are equipped with internal circuitry that enables electric power from the host computer to be conveyed to the transmit/receive antenna of the base board and after reception by the mouse device, electrical energy is supplied to its internal circuit; the two-dimension signal generated as the mouse device is moved on the base board is received by the transmit/receive antenna of the base board and transferred to the host computer to thereby enable control of the host system; the resulting wireless mouse device structure of the present invention differs significantly from conventional wireless mouse device arrangements in that the shortened interactive operating distance not only results in error-free signal detection and zero RF signal interference performance, but also does not require batteries, has a reduced malfunction rate, and is lightweight.

To enable a further understanding of the technological content, other objectives, and structural refinements of the present invention, the brief description of the drawings below is followed by the detailed description of the invention herein.

DETAILED DESCRIPTION OF THE INVENTION

Figure 1:
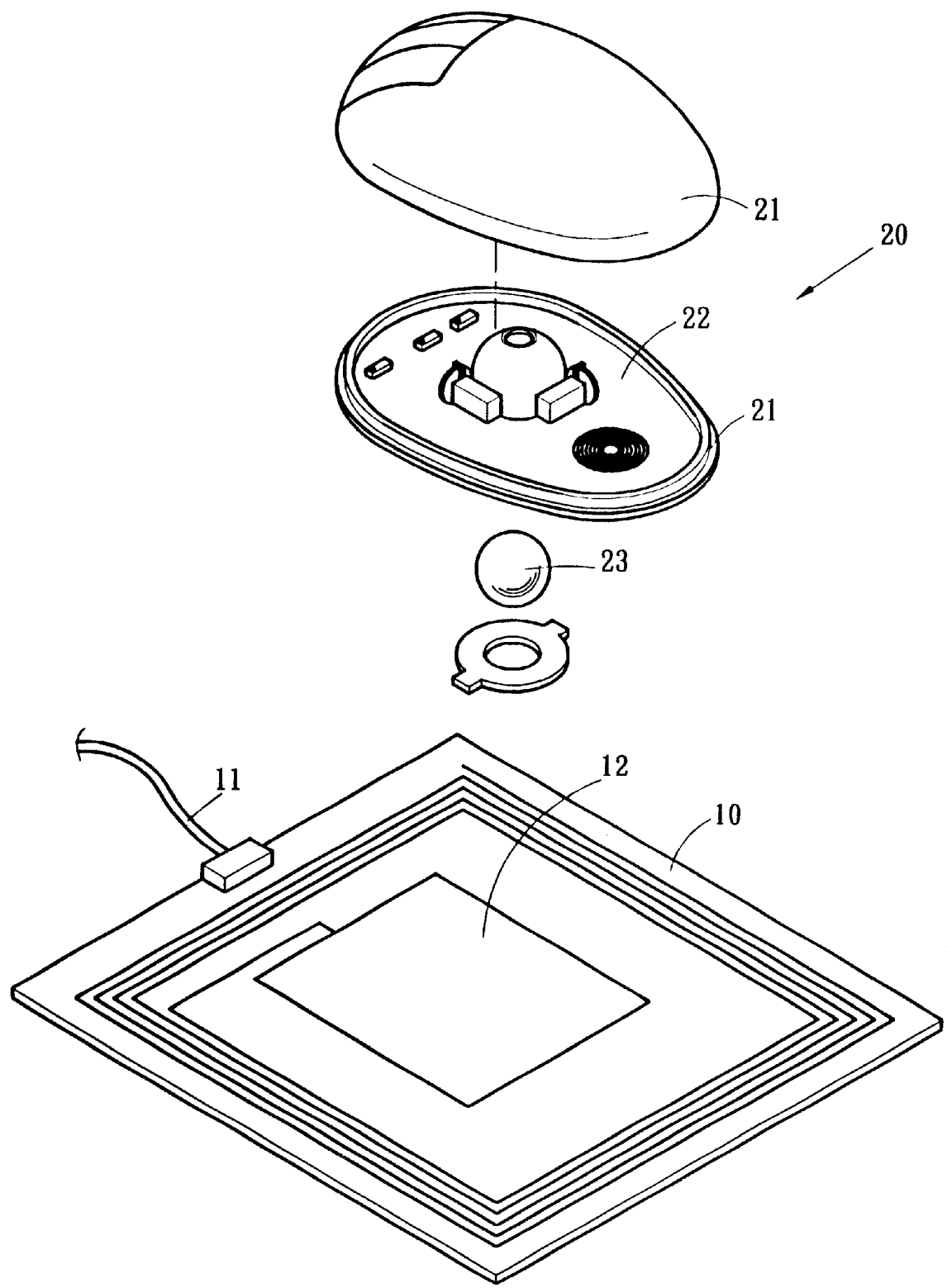
FIG. 1 is an exploded drawing of the invention herein.
Figure 2:
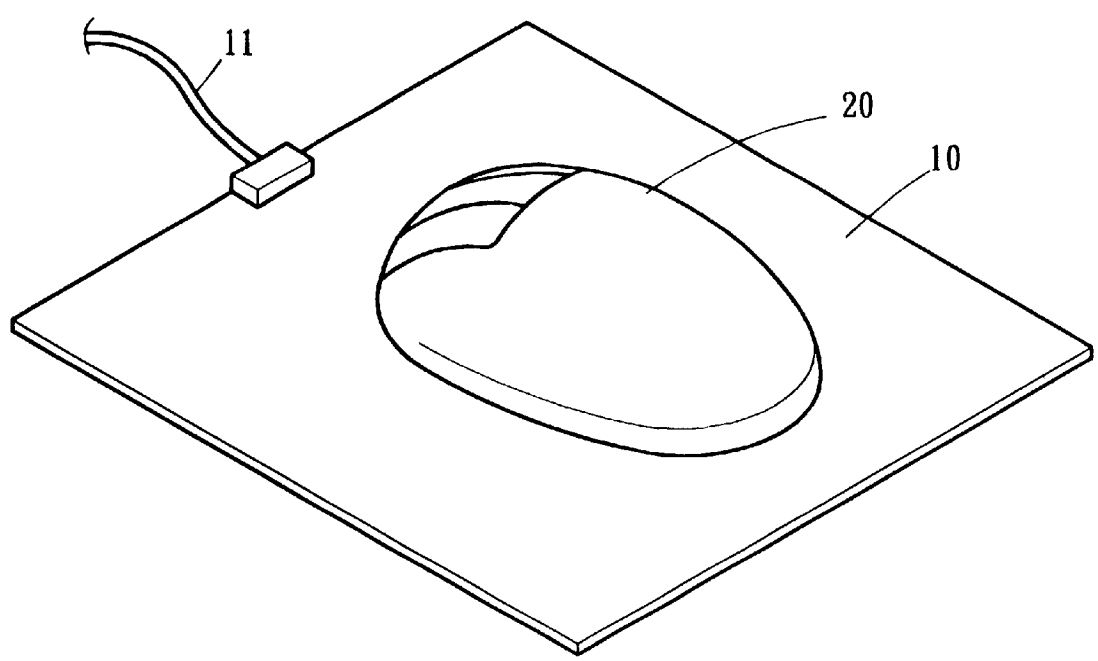
FIG. 2 is an isometric drawing of the invention herein.

Referring to FIG. 1 and FIG. 2, the improved structure cordless mouse device of the invention herein is comprised of a base board 10 and a mouse device 20.

Figure 3:
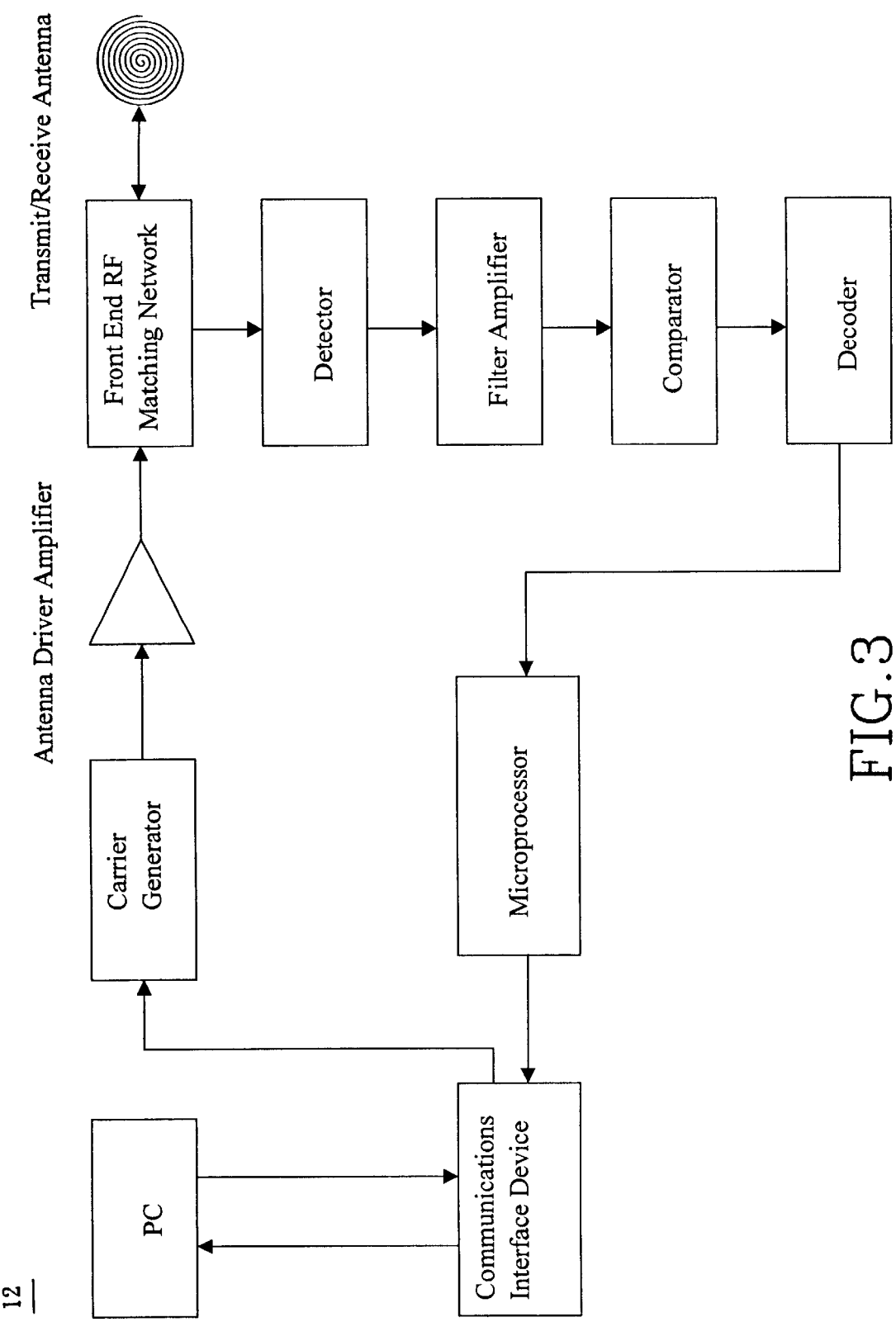
FIG. 3 is a block diagram of the base board circuitry of the invention herein.

The base board 10 utilizes a signal cable 11 connected to a host computer and a first circuit 12 is disposed in the base board 10. Referring to FIG. 3, the signal handling sequence of the said first circuit 12 involves a carrier generator, an antenna driver amplifier, a front end radio frequency (RF) matching network, a transmit/receive antenna, a detector, a filter amplifier, a comparator, a decoder, a microprocessor, and a communications interface device.

The mouse device 20 consists of an enclosure 21, a second circuit 22, and a roller ball 23, wherein the second circuit 22 is composed of a transmit/receive antenna, a front end RF matching network, a rectification network, a clock regenerator, a power supply regulator, a signal modulator, an encoder, and a two-dimension displacement sensor.

Figure 4:
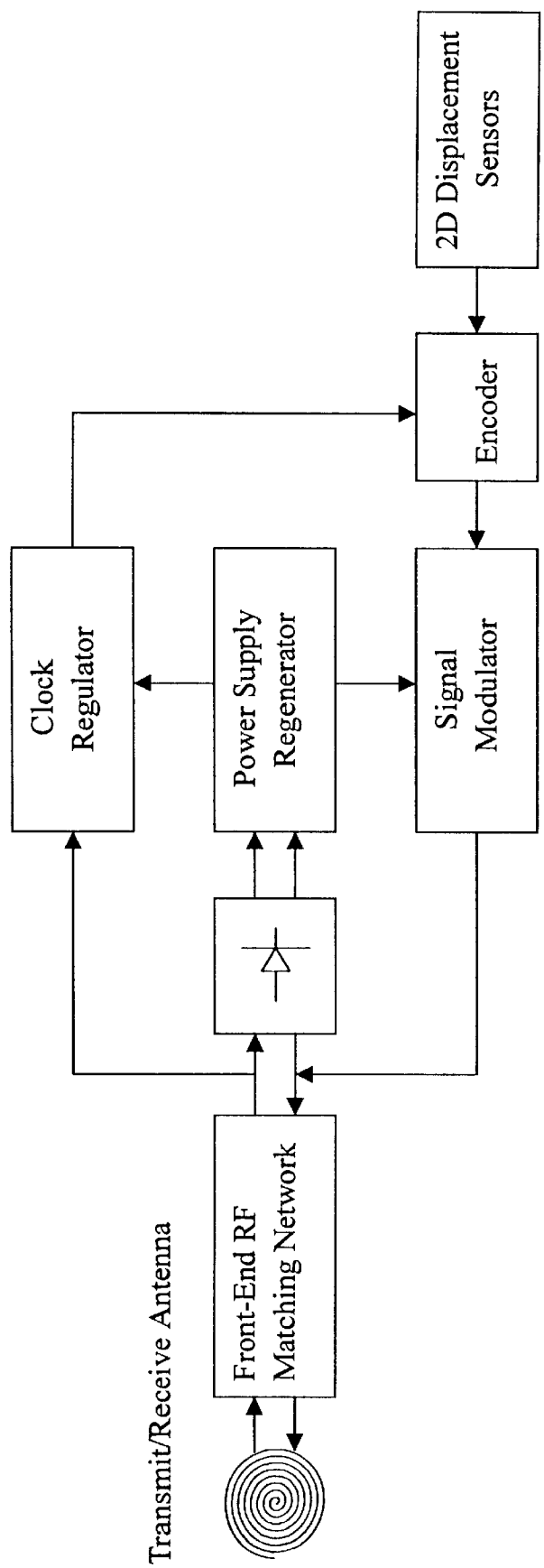
FIG. 4 is a block diagram of the mouse device circuitry of the invention herein.

Referring to FIG. 3 and FIG. 4, no physical connection cable (signal or power cable) is present between the mouse device 20 and the base board 10. Furthermore, the mouse device 20 does not require a battery for operation; after the signal cable 11 of the base board 10 is connected to a host computer, the computer system power supply outputs power through the signal cable 11 and the carrier generator produces a signal at a preset frequency. The preset frequency is conducted through the antenna driver amplifier and the front end radio frequency RF matching network up to the transmit/receive antenna, and then the radiated signal proceeds through the rectification network of the second circuit 22 and the power supply regulator to provide electricity to the components of the second circuit 22. System clock operation involves the reception of an RF signal from the base board 10 by the mouse device 20 transmit/receive antenna and reiteration by the clock-pulse regenerator.

When the mouse device 20 is moved and the roller ball 23 rotates, the horizontal and vertical extent of movement is monitored by the two-dimension displacement sensor in the second circuit 22, after which the encoder converts the information into digital data that is rendered into analog form by the signal modulator, with the resulting signal then sent to the front end RF matching network and radiated from the transmit/receive antenna; after the detector and wave filter amplifier of the first circuit 12 appropriately refine and boost the received signal, the comparator converts the movement information back into digital form for processing by the microprocessor; finally, the signal is transferred from the communications interface device to the host computer.

In other words, the base board 10 functions as the pad of the mouse device 20 and as the mouse device 20 is being utilized, its operating power is supplied wirelessly from the base board 10, with the digital data of its movement conveyed wirelessly to the base board 10 and, furthermore, since the base board 10 is connected to the host computer via the signal cable 11, the data and electric power transfers between the base board 10 and the mouse device 20 occur synchronously without adversely affecting data reading integrity; additionally, since the mouse device 20 and the base board 10 operate in close proximity and the RF signal strength is only adjusted to the reception range of the base board 10, the RF signal will not interfere with other similar mouse devices being utilized nearby.

Although the signal cable 11 is utilized to connect the base board 10 to the host computer, since electric power and data are transmitted cordlessly between the mouse device 20 and the base board 10, the mouse device 20 itself is not constrained by signal cable 11 length limitations during operation and, furthermore, the signal cable 11 cannot be damaged as a result of mouse operation.

With the cordless mouse device improvements of the invention herein, the following advantages are provided:

1. Problematic capacitive or optical positioning shortcomings are non-existent, because a displacement sensing routine replaces the roller ball mechanism.
2. Operation and utilization are much easier because there is no physical conductive wiring (signal cable) connected to the mouse device 20.
3. The operating power of the mouse device 20 is supplied as an RF signal from the base board 10 and, therefore, batteries are not required and utilization costs are reduced.
4. Since batteries are unnecessary, corrosion from electrolyte leakage and environmental protection considerations are no longer issues.
5. The absence of a physical control cable eliminates the frequent broken cable and poor connection problems of corded mouse devices.
6. RF signal transmission and reception is omnidirectional, unlike infrared devices which are subject to directional transmission limitations during operation and, furthermore, require a line of communications that is not obstructed by a solid object.
7. Lower malfunction rates because the circuit is simpler and consumes minimal power.
8. Lightweight construction.

In summation of the foregoing section, since the improved structure cordless mouse device of the invention herein is not susceptible to the shortcomings of the conventional mouse devices and, furthermore, provides advantages that facilitate the more convenient use of such input devices, while ensuring reliable cordless signal transmission capabilities, the present invention is both progressive and utilitarian and, therefore, the structural innovations meet new patent application requirements and as such, the invention herein is lawfully submitted for review.

What is claimed is:

1. A wireless mouse device for inputting data into a computer comprising:

a) a base board mouse pad having a first circuit adapted to be connected to the computer and including a carrier generator, an antenna driver amplifier connected to the carrier generator, a first front end radio frequency (RF) matching network connected to the antenna driver amplifier, a first transmit/receive antenna coupled to the front end RF matching network, a detector connected to the front end RF matching network, a filter amplifier connected to the detector, a comparator connected to the filter amplifier, a decoder connected to the comparator, a microprocessor coupled with the decoder and a communications interface device connected to the microprocessor and to the computer; and, b) a mouse device movable on the base board and having a roller ball, and an enclosure enclosing a second circuit including a second transmit/receive antenna, a second front end RF matching network, a rectification network coupled to the second transmit/receive antenna, a clock regulator connected to the second transmit/receive antenna, a power supply regenerator coupled to the clock regulator and to the rectification network, an encoder connected to the clock regulator, a signal modulator connected to the encoder, the power supply regenerator and to the second front end RF matching network, and a two-dimension displacement sensor connected to the encoder to sense movement of the roller ball, whereby electric power is supplied to the second circuit from the computer via the first and second transmit/receive antennas and whereby movement of the roller ball is converted into signals by the second circuit and transmitted to the first circuit via the first and second transmit/receive antennas to input data into the computer without wire connections between the mouse and the computer.

* * * * *